(12) United States Patent  
Kanda et al.

(10) Patent No.: US 8,923,328 B2
(45) Date of Patent: *Dec. 30, 2014

(54) METHOD AND SYSTEM FOR FACILITATING APPLICATION-ORIENTED QUALITY OF SERVICE IN A FIBRE CHANNEL NETWORK

(75) Inventors: Amit Kanda, San Jose, CA (US); Sathish Kumar Gnanasekaran, Santa Clara, CA (US); Vineet Mathew Abraham, Sunnyvale, CA (US); Qingyuan Ma, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 722 days.

This patent is subject to a terminal disclaimer.

(21) Appl. No.: 12/119,436

(22) Filed: May 12, 2008

(65) Prior Publication Data

US 2009/0316721 A1    Dec. 24, 2009

Related U.S. Application Data

(60) Provisional application No. 61/002,252, filed on Nov. 7, 2007.

(51) Int. Cl.
*H04J 3/16* (2006.01)
*H04L 12/801* (2013.01)
*H04Q 11/00* (2006.01)
*H04L 5/00* (2006.01)
*H04L 12/825* (2013.01)

(52) U.S. Cl.
CPC ............ *H04Q 11/0005* (2013.01); *H04L 47/10* (2013.01); *H04L 5/0037* (2013.01); *Y02B 60/31* (2013.01); *H04L 47/12* (2013.01); *H04L 47/263* (2013.01); *H04L 47/11* (2013.01)
USPC ......................................... 370/468

(58) Field of Classification Search
CPC .............................. G06F 9/5061; G06F 9/5077
USPC ......................... 370/229–235, 252, 253, 468; 709/223–226, 238, 240, 241
See application file for complete search history.

(56) References Cited

U.S. PATENT DOCUMENTS

| | | | |
|---|---|---|---|
| 5,838,994 A | | 11/1998 | Valizadeh |
| 7,123,619 B1 * | | 10/2006 | Lefebvre ...................... 370/230 |
| 7,668,177 B1 * | | 2/2010 | Trapp et al. .............. 370/395.42 |
| 2003/0156583 A1 * | | 8/2003 | Prager et al. ................. 370/389 |
| 2006/0013135 A1 | | 1/2006 | Schmidt |
| 2006/0092932 A1 | | 5/2006 | Ghosh |
| 2006/0233102 A1 * | | 10/2006 | Kusumoto .................... 370/229 |
| 2006/0251067 A1 * | | 11/2006 | DeSanti et al. ............... 370/466 |
| 2007/0174851 A1 * | | 7/2007 | Smart .......................... 719/324 |

* cited by examiner

*Primary Examiner* — Pao Sinkantarakorn
(74) *Attorney, Agent, or Firm* — Shun Yao; Park, Vaughan, Fleming & Dowler LLP

(57) ABSTRACT

One embodiment of the present invention provides a system that facilitates quality of service (QoS) in a Fiber Channel (FC) network. During operation, a host bus adaptor (HBA) allocates the bandwidth on an FC link between the HBA and an FC switch into a plurality of logical channels, wherein a respective logical channel can transport data frames of variable length. Furthermore, a respective logical channel is associated with a dedicated buffer on the HBA. The HBA associates data frames from a logical entity associated with the HBA with a logical channel, and transmits data frames from the logical entity to the FC switch on the corresponding logical channel within the link from the HBA to the FC switch.

22 Claims, 11 Drawing Sheets

METHOD AND SYSTEM FOR FACILITATING APPLICATION-ORIENTED QUALITY OF SERVICE IN A FIBRE CHANNEL NETWORK

RELATED APPLICATION

This application claims benefit under 35 U.S.C. section 119 of U.S. Provisional Patent Application Ser. No. 61/002,252, filed 7 Nov. 2007.

The subject matter of this application is related to the subject matter in the following co-pending non-provisional applications:

U.S. patent application Ser. No. 12/119,440, entitled "AUTOMATIC ADJUSTMENT OF LOGICAL CHANNELS IN A FIBRE CHANNEL NETWORK," by inventors Amit Kanda and Kung-Ling Ko, filed 12 May 2008;

U.S. patent application Ser. No. 12/119,448, entitled "METHOD AND SYSTEM FOR CONGESTION MANAGEMENT IN A FIBRE CHANNEL NETWORK," by inventor Amit Kanda, filed 12 May 2008;

U.S. patent application Ser. No. 12/119,457, entitled "WORKLOAD MANAGEMENT WITH NETWORK DYNAMICS," by inventor Amit Kanda, filed 12 May 2008;

U.S. patent application Ser. No. 12/119,430, entitled "METHOD AND SYSTEM FOR FACILITATING QUALITY OF SERVICE IN EDGE DEVICES IN A FIBRE CHANNEL NETWORK," by inventor Amit Kanda, filed 12 May 2008; and U.S. patent application Ser. No. 11/782,894, entitled "Method and Apparatus for Determining Bandwidth-Consuming Frame Flows in a Network," by inventor Amit Kanda, filed 25 Jul. 2007;

the disclosures of which are incorporated by reference in their entirety herein.

BACKGROUND

1. Field

The present disclosure relates to Fibre Channel networks. More specifically, the present disclosure relates to a method and system for facilitating quality of service in edge devices in a Fibre Channel network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions such as building large server farms.

A predominant form of SAN is the Fibre Channel (FC) network. FC standards were developed based on High Performance Parallel Interface (HIPPI), a data channel standard developed by Los Alamos National Laboratory in the 1980's. HIPPI was designed as a supercomputer I/O interface with high throughput and minimal switching function. As time went on, optical fiber became cheaper and more reliable, and FC was developed as a successor to HIPPI to take advantage of the high capacity of fiber optics. FC can carry data channels including HIPPI, Small Computer Systems Interface (SCSI), and multiplexor channels used on mainframes, as well as network traffic, including IEEE 802, Internet Protocol (IP), and Asynchronous Transfer Mode (ATM) packets. Like HIPPI, the basic topology of an FC network is a star topology with a switch fabric at the center to connect inputs to outputs.

Historically, conventional network appliances (e.g., data-center servers, disk arrays, backup tape drives) mainly use an FC network to transfer large blocks of data. Therefore, FC switches provide only basic patch-panel-like functions. In the past decade, however, drastic advances occurred in almost all the network layers, ranging from the physical transmission media, computer hardware and architecture, to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual machines, have unleashed the power of fast hardware and provide an unprecedented versatile computing environment.

As a result of these technological advances, an FC switch fabric faces a much more heterogeneous, versatile, and dynamic environment. The limited network functions in a conventional switch fabric can hardly meet these demands. For instance, a switch fabric may transport two data flows with different requirements on the same inter-switch link, where one flow is between two mission-critical applications and the other is for a simple data backup. These two flows have different quality of service (QoS) requirements, which are difficult to attain at the same time in conventional FC networks.

SUMMARY

One embodiment of the present invention provides a system that facilitates quality of service (QoS) in a Fibre Channel (FC) network. During operation, a host bus adaptor (HBA) allocates the bandwidth on an FC link between the HBA and an FC switch into a plurality of logical channels, wherein a respective logical channel can transport data frames of variable length. Furthermore, a respective logical channel is associated with a dedicated buffer on the HBA. The HBA associates data frames from a logical entity associated with the HBA with a logical channel, and transmits data frames from the logical entity to the FC switch on the corresponding logical channel within the link from the HBA to the FC switch.

In a variation on this embodiment, the logical entity associated with the HBA can be one or more of a physical appliance, a virtual appliance, an application, and a sub-application message group.

In a further variation, the virtual appliance is a virtual machine running on a physical machine, and the application can be an application running on the virtual machine.

In a variation on this embodiment, the HBA groups a plurality of logical channels into clusters.

In a further variation, the HBA assigns a respective logical channel or cluster of logical channels to a respective quality-of-service (QoS) class.

In a variation on this embodiment, the HBA assigns a weight to the buffer for a respective logical channel, and retrieves data frames from the buffers for transmission in their corresponding logical channels in a weighted round robin fashion based on the respective weights assigned to the buffers.

In a variation on this embodiment, the HBA requests a plurality of port identifiers from the FC switch during initialization, wherein a respective port identifier corresponds to a logical entity.

In a variation on this embodiment, the HBA associates, during runtime, data frames from a newly added logical entity with a respective logical channel.

In a variation on this embodiment, the HBA disassociates data frames from the logical entity from the logical channel.

In a variation on this embodiment, the HBA changes the logical channel associated with data frames from the logical entity during runtime.

In a variation on this embodiment, the HBA receives a data frame from the FC switch on a logical channel. The HBA then determines a QoS class for the data frame based on the logical channel, and forwards the content of the data frame to the logical entity in accordance with requirements for that QoS class.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

Overview

Embodiments of the present invention facilitate provisioning of QoS in conjunction with virtual channels to the edge devices in an FC network. Particularly, different QoS levels can now be tailored to the needs of different granularities, such as physical appliances, virtual machines, applications, and sub-application message groups. These new features provide a much more versatile and flexible network environment. Furthermore, the use of virtual channels at edge devices within an FC network allows application oriented QoS provisioning, which has not been possible with conventional host bus adaptors and FC switch fabrics.

Figure 1:
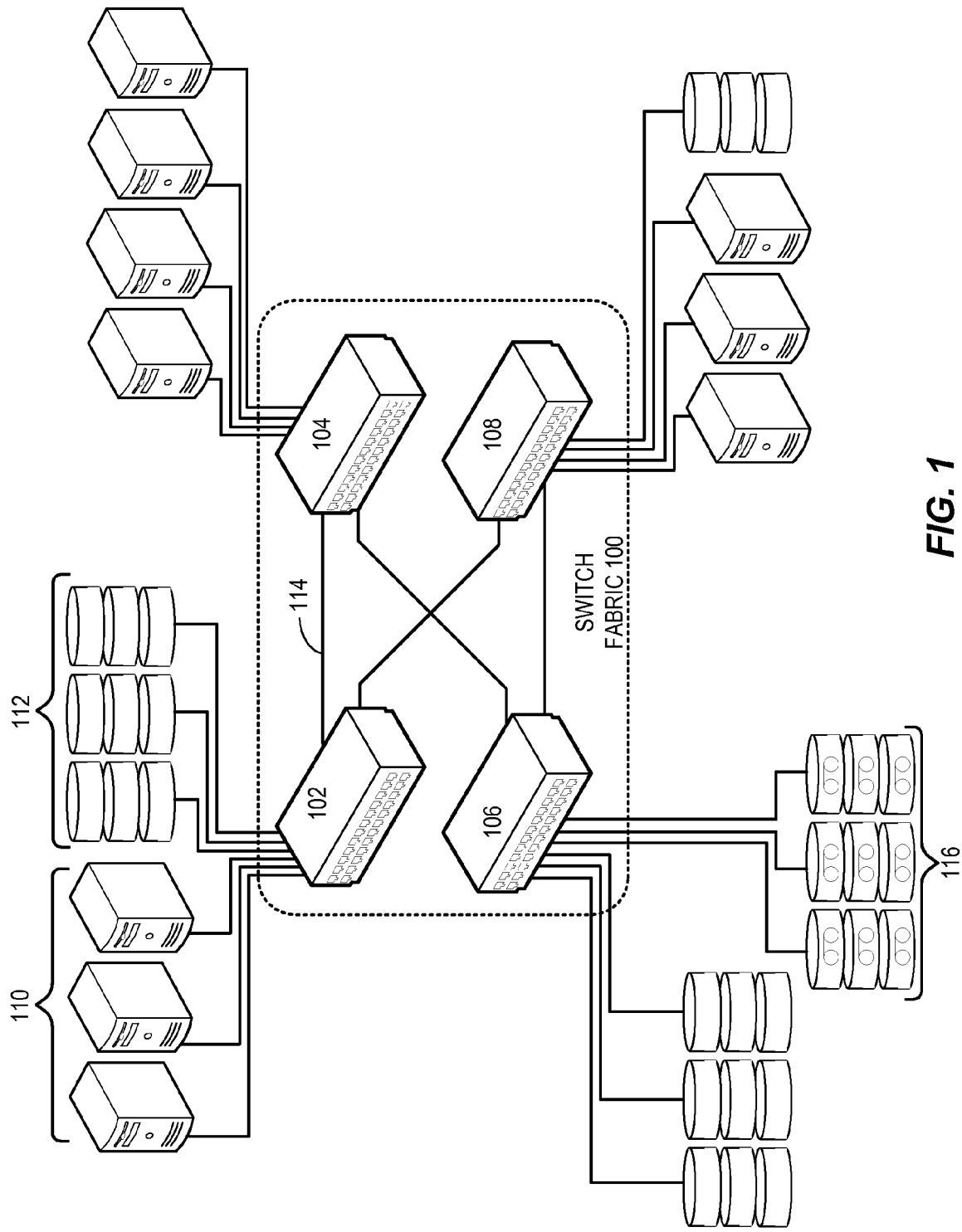
FIG. 1 illustrates an exemplary FC network that provides application-oriented QoS capabilities in edge devices, in accordance with an embodiment of the present invention.

FIG. 1 illustrates an exemplary FC network that provides application-oriented QoS capabilities in edge devices, in accordance with an embodiment of the present invention. In this example, an FC switch fabric 100 includes four switch modules, 102, 104, 106, and 108. Each switch module is coupled to a group of network appliances. For example, switch module 102 is coupled to a number of servers 110 and a number of disk arrays 112. A respective network appliance can communicate with any appliance (referred to as "target") in the FC network.

For example, one of the servers 110 can transfer data to and from one of tape backup devices 116. Note that, since the switch modules are not connected in a fully meshed topology, the data frames transferred between servers 110 and tape devices 116 traverse three switch modules 102, 104, and 106. In general, the switch modules are coupled by inter-switch links (ISLs), such as ISL 114.

As shown in the example in FIG. 1, large-port-count FC switch fabrics often include a number of smaller, interconnected individual switches. The internal connectivity of a switch fabric can be based on a variety of topologies. In this disclosure, the term "switch fabric" refers to a number of interconnected FC switch modules. The terms "switch module" and "switch" refer to an individual switch which can be connected to other switch modules to form a larger port-count switch fabric. The term "edge device" refers to any network appliance, either physical or logical, coupled to a switch.

A switch typically has two types of ports: fabric port (denoted as F_Port), which can couple to a network appliance, and extension port (E_Port), which can couple to another switch. A network appliance communicates with a switch through a host bus adaptor (HBA). The HBA provides the interface between an appliance's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

The recent advances in virtual machine software have brought new challenges to FC networks. Virtual-machine software allows multiple copies of operating systems to run concurrently on a physical machine, thereby allowing multiple virtual servers to run simultaneously in a relatively isolated manner. Server virtualization allows an enterprise to allocate different server resources to different application needs. Running virtual servers is a flexible and cost-effective solution, because one can now isolate the consumption of processing power between different servers and prevent overloaded servers from consuming all the computing resources. Furthermore, virtual servers facilitate software-based dynamic load balancing, a desirable feature in modem server farms.

The virtualization of machines makes an otherwise static FC network more dynamic and unpredictable. For example, when certain virtual servers in the network are dynamically allocated to handle mission-critical traffic, it is important for the FC switches along the data path to give higher priority to data frames to and from these virtual servers. In conventional FC networks, such special treatment is not possible, because neither the HBA nor the switch can distinguish data frames from different virtual servers residing on the same physical machine.

Embodiments of the present invention provide novel mechanisms that allow differentiated QoS provisioning to virtual machines running on the same physical machine. Furthermore, different QoS levels can be associated with a large range of logical entities at different hierarchies, e.g., physical machine, virtual machine, application, and sub-application message groups. Note that in this disclosure the term "QoS" or "quality of service" refers to an arbitrary set of service quality parameters. A QoS level or class can be based on an arbitrary number of metrics. For example, a given QoS level can specify a guaranteed or best-effort data rate. A more sophisticated QoS level can further specify other parameters, such as maximum delay and delay variation, maximum data frame loss rate, and maximum frame misdelivery rate.

In one embodiment, a network appliance's HBA and the FC switch can divide the bandwidth of a physical link into logical channels. These virtual channels can be associated with different priorities with respect to network resource allocations corresponding to different QoS levels. The HBA further associates different virtual channels with different applications. Hence, different QoS levels can be guaranteed at the virtual server, or even the application or sub-application level. In the example shown in FIG. 1, each of servers 110 may be running two copies of virtual servers. Each virtual server may send and receive data on a separate virtual channel with a given data rate, according to each virtual server's service level agreement.

Virtual Channel and QoS

Conventionally, to prevent a target device from being overwhelmed with data frames, an FC network provides several flow control mechanisms based on a buffer credit system. A credit represents a device's ability to accept one frame. A sender maintains a transmission buffer, and retrieves and transmits one frame when a credit is received from the receiving device. In previous generations of FC switches, each outgoing link on a switch or HBA is associated with one buffer. This buffer is responsible for storing data frames from data flows. In this disclosure, the term "data flow" is loosely defined as the data frames flowing from a source ID (S_ID) to a destination ID (D_ID). In conventional FC networks, the source ID refers to the outgoing port on the source HBA, and the destination ID refers to the incoming port on the destination HBA. In this disclosure, however, a source or destination ID can be associated with a wide range of logical entities, including a physical appliance (e.g., a physical server) to which an HBA belongs, a virtual appliance, an application, or a sub-application message group.

One problem associated with the conventional buffer configuration is that it is very difficult to provide different QoS to different data flows when these data flows are transported on a common link. For example, if the receiving device of a data flow is very slow in processing the received data frames, the source device is likely to flood the buffers along its data path with its data frames. As a result, other data flows will not be able to use these buffers. Furthermore, the data frames from the slow flow can cause head-of-the-queue block to the buffers along the data path, resulting in under-utilization of the network.

One way to solve this problem is to divide the bandwidth in an inter-switch link into logical channels and serve each logical channel with a separate buffer. This way, different data flows can be assigned to different logical channels and, since each logical channel has a separate buffer, the data flows can be sufficiently isolated from each other. Furthermore, a switch can provide different QoS levels to the logical channels, because it is now possible to implement various buffer scheduling schemes. For example, it is now possible to allocate different guaranteed or best-effort data rates to different logical channels or groups of logical channels by using a weighted round-robin scheme when retrieving and transmitting data frames stored in the different buffers.

In one embodiment, such logical channels are also referred to as "virtual channels" or "VCs." More implementation details of virtual channels are disclosed in U.S. Pat. No. 7,239,641, entitled "Quality of Service Using Virtual Channel Translation" by Banks, et al., and "Virtual Channels for Switched Fabric" by Martin, et al., available at www.t10.org/ftp/t11/document.04/04-093v0.pdf, the disclosure of which is incorporated by reference herein in its entirety.

Note that the virtual channel concept in FC networks should be distinguished from "virtual circuit" (which is sometimes also called "virtual channel") in ATM networks. An ATM virtual circuit is an end-to-end data path with a deterministic routing from the source to the destination. That is, in an ATM network, once the virtual circuit for an ATM cell is determined, the entire route throughout the ATM network is also determined. More detailed discussion on ATM virtual circuits can be found in "Computer Networks," Section 5.6, by A. S. Tanenbaum, 3rd Ed., Prentice-Hall, 1996.

In contrast, an FC virtual channel is a local logical channel for a respective link between switches. That is, an FC virtual channel only spans over a single link. When an FC data frame traverses a switch, the virtual channel information can be carried by appending a temporary tag to the frame. The allows the frame to be associated to the same VC identifier on outgoing link of the link. However, the VC identifier does not determine a frame's routing, because frames with different destinations can have the same VC identifier and be routed to different outgoing ports. An ATM virtual circuit, on the other hand, spans from the source to the destination over multiple links. Furthermore, an FC virtual channel carries FC data frames, which are of variable length. An ATM virtual circuit, however, carries ATM cells, which are of fixed length.

Figure 2:
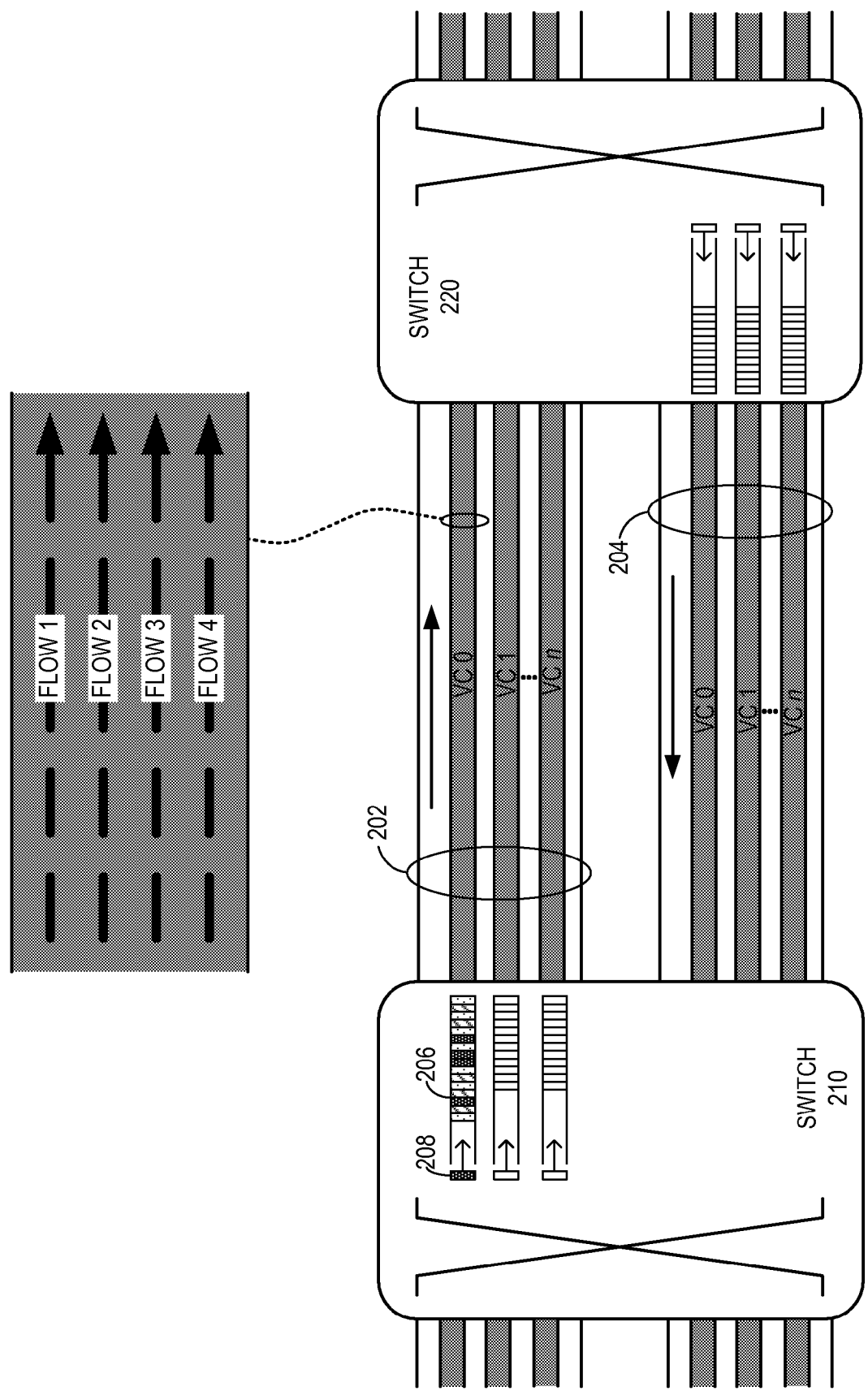
FIG. 2 illustrates exemplary virtual channels and data flows, in accordance with an embodiment of the present invention.

FIG. 2 illustrates exemplary virtual channels and data flows, in accordance with an embodiment of the present invention. In this example, a switch 210 is coupled to a switch 220 by an outgoing physical link 202 and an incoming physical link 204. Each physical link is divided into a number of virtual channels. For example, link 202 is divided into virtual channels VC 0, VC 1, . . . , VC n. A respective virtual channel is associated with a buffer dedicated to that virtual channel. Furthermore, a buffer may store data frames from a number of data flows. Correspondingly, a virtual channel can carry multiple data flows.

For example, VC 0 on link 202 is associated with a transmission buffer 206 in switch 210. Buffer 206 stores data frames from multiple data flows, such as data frame 208. Note that in FIG. 2 different frames of different data flows in buffer 206 are presented with different fill patterns. FIG. 2 also illustrates a zoomed-in view of the contents of VC 0 on link 202. Here VC 0 of link 202 carries four data flows, FLOW 1, 2, 3, and 4. Note that these flows may correspond to the same source and destination or to different source and destination. In other words, although these flows share the same virtual channel on link 202, they might belong to different end-to-end routes. This is an important distinction between FC virtual channels and ATM virtual circuits, because all the data cells in an ATM virtual circuit belong to the same source/destination pair.

In one embodiment, the VCs on a link can be assigned to different QoS levels, and the switch can schedule transmission from their respective buffers accordingly. For example, among all the VCs on a link, some VCs may have guaranteed bandwidth, wherein the switch periodically serves the buffer associated with these VCs to guarantee a minimum data rate. Other VCs may be assigned different weights and participate in a weighted round-robin scheme in transmitting frames in their respective buffers. Note that a variety of buffer-scheduling schemes can be used to achieve different QoS results.

Figure 3:
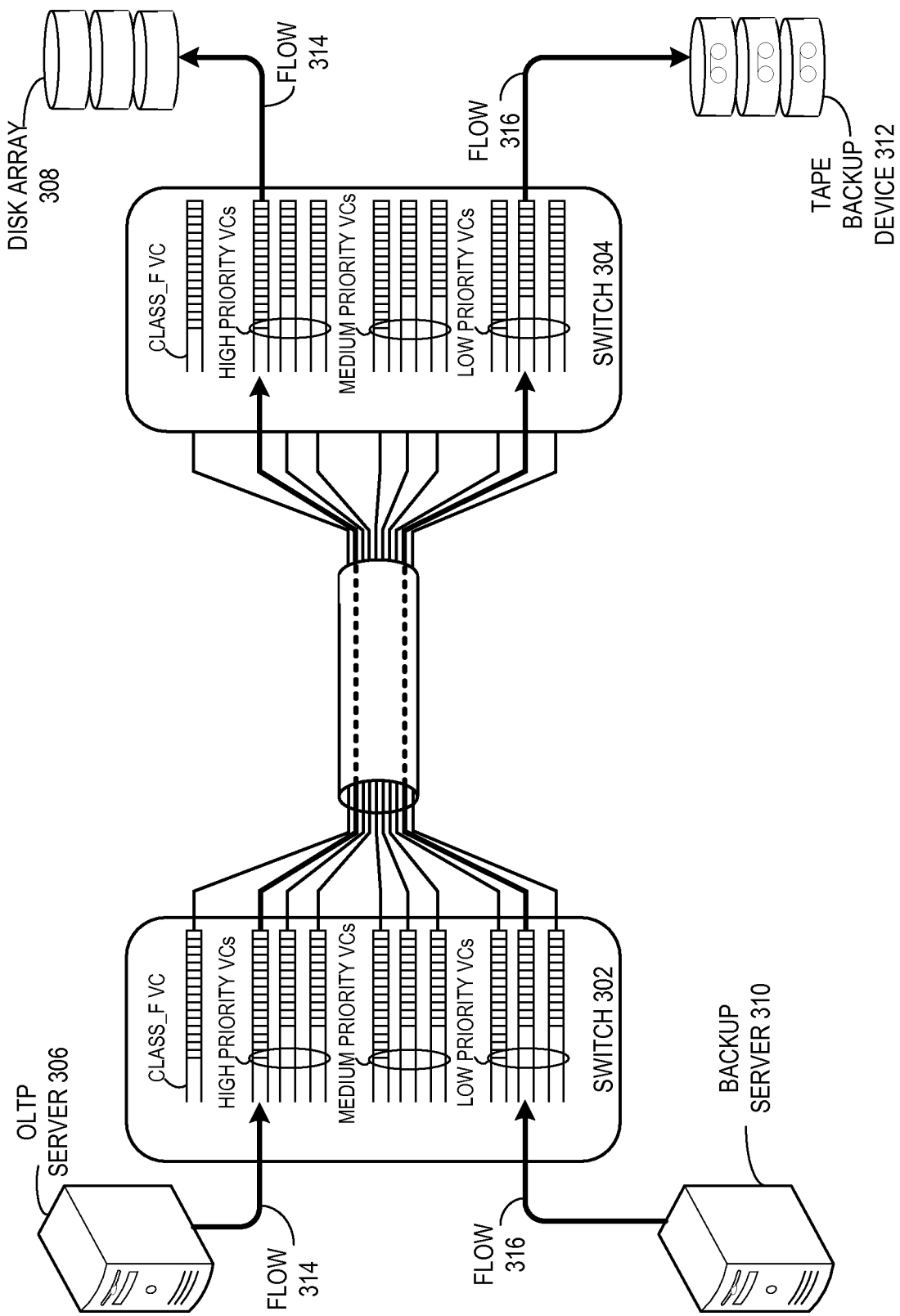
FIG. 3 illustrates an example of providing different QoS to different data flows in an FC switch fabric, in accordance with an embodiment of the present invention.

FIG. 3 illustrates an example of providing different QoS to different data flows in an FC switch fabric, in accordance with an embodiment of the present invention. In this example, the physical link between switches 302 and 304 contains a number of VCs. These VCs are grouped into several QoS classes: Class_F, high priority, medium priority, and low priority. The Class_F VC corresponds to the Class_F traffic as defined in the FC standards and carries critical network control and management traffic. In one embodiment, the Class_F VC (or VCs) is served with a strict-priority scheduling scheme. The other three QoS classes can use a weighted round-robin scheduling scheme. In one embodiment, a respective VC in the high, medium, and low QoS classes is assigned a relative weight.

In the example in FIG. 3, a data flow 314 is originated from an online transaction processing (OLTP) server 306 and destined for a disk array 308. Flow 314 carries mission-critical transaction data, and therefore is assigned to a VC with high priority. Meanwhile, a second data flow 316 is carried on the same physical link. Data flow 316 is between a backup server 310 and a tape backup device 312. Flow 316 is assigned to a VC with low priority, because backup usually does not require the same level of latency guarantee as an OLTP transaction. Since each VC has a separate buffer, flows 314 and 316 can be transported on the same physical link independent from each other. In other words, even if tape backup device 312 is slow in processing data frames, data frames from flow 316 do not interfere with the data transfer of flow 314.

Although the VC configuration illustrated in FIG. 3 can isolate data flows between switches, a new challenge arises when one physical machine runs multiple virtual machines and produces multiple data flows. For example, when OLTP server 306 runs multiple copies of virtual servers or different applications, the data generated by each virtual server or application may be of different importance. However, if all the data are co-mingled and share the bandwidth of the link between the HBA of server 306 and switch 302, the low-priority data can preempt high-priority data. Such a problem exists because conventional HBAs are nothing more than a network interface card. When the host machine is virtualized, and when different applications have different QoS requirements, the limited functions of a network interface card can no longer suffice.

Application Oriented QoS

Embodiments of the present invention allow VCs and different QoS classes to be extended to logical entities with different granularities associated with an HBA. Such logical entities include, but are not limited to: physical appliances, virtual appliances, applications, and sub-application message groups. A physical appliance can be any physical device that can communicate with an FC switch, such as a server, a disk array, or a tape backup device. A virtual appliance can be any logical device, such as a virtual machine or a virtual drive. An application can be any program running on a physical or virtual appliance. A sub-application message group can be any set of data that are communicated within an application. For example, the critical financial transaction data communicated within an e-commerce application can be one message group, while the data exchange for regular browsing can be a different message group.

In embodiments of the present invention, VC-based QoS can be extended to the end points residing with the HBAs. Furthermore, these end points are not limited to physical entities, but can include any type of logical entities at different levels. Such extension significantly improves the flexibility of the FC network. With these new capabilities, an FC network can quickly adapt to a dynamic and heterogeneous network environment.

Figure 4:
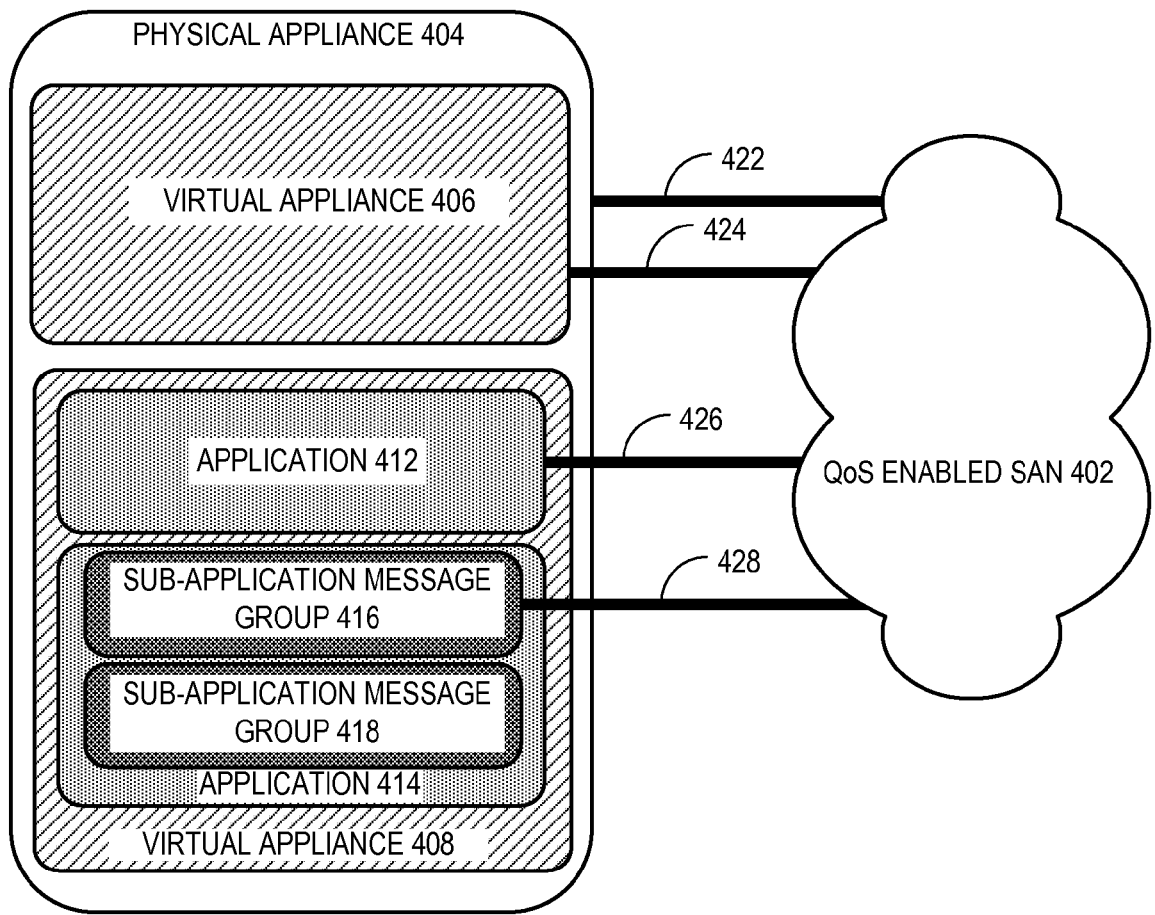
FIG. 4 illustrates QoS provisioning to different logical entities within a physical appliance, in accordance with an embodiment of the present invention.

FIG. 4 illustrates QoS provisioning to different logical entities within a physical appliance, in accordance with an embodiment of the present invention. The example in FIG. 4 shows how different logical entities, or device objects, can be classified and associated with VCs. In one embodiment, a network end device has an outer object which is a physical appliance, such as a physical appliance 404, and which can be referred to by an FC network address (world-wide name or N_Port). Physical appliance 404 may host one or more virtual appliances, such as virtual appliances 406 and 408, each of which can also be referred to by an FC network address, such as an N_Port ID Virtualization (NPIV) address. Similarly, a virtual appliance may host multiple applications, such as applications 412 and 414, and a respective application may include many sub-application message groups, such as sub-application message groups 416 and 418.

In one embodiment, each level of the logical entities is referred to as object class. For example, there can be physical-appliance class, virtual-appliance class, application class, and sub-application class. Other definition of object classes is also possible. Each object in an object class, e.g., a physical appliance, a virtual appliance, or an application, can be associated with an individual VC and a QoS class. For example, physical appliance 404 can send data to a QoS enabled SAN 402 using VC 422. Meanwhile, virtual appliance 406, application 412, and sub-application message group 416 can each transfer data to SAN 402 via VCs 424, 426, and 428 respectively.

Figure 5:
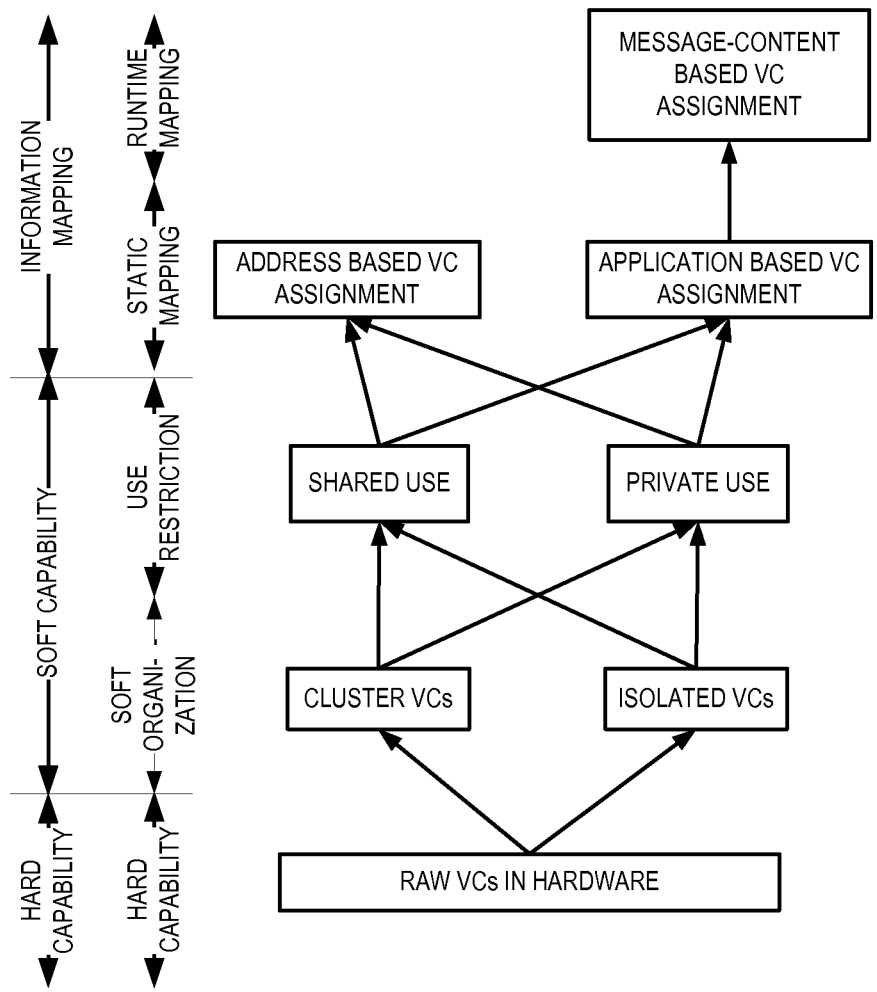
FIG. 5 illustrates a conceptual roadmap of QoS provisioning based on virtual channels, in accordance with an embodiment of the present invention.

FIG. 5 illustrates a conceptual roadmap of QoS provisioning based on virtual channels, in accordance with an embodiment of the present invention. From bottom up, the hard capability refers to the hardware's (HBA or switch) capability of receiving and transmitting data frames via VCs. In one embodiment, the VC-handling capabilities can be implemented in the ASICs of the HBA or switch. Within the scope of hard capability, each VC is regarded as an independent entity.

Above the hard capability, the soft capability allows the hard capabilities to meet specific customer's business or deployment requirements. In one embodiment, the soft capability is divided into two sub categories, soft organization and use restriction. Soft organization allows the VCs to be logically clustered to form a group (referred to as Cluster VCs) or isolates individual VCs that could be assigned to specific flows or tasks. More specifically, for Cluster VCs, the soft organization allows a set of VCs to be logically clustered. For Isolated VCs, the soft organization allows reservation of specific VCs that can be assigned to a group of activities or a single activity.

The use restriction allows Cluster or Isolated VCs to be associated with their respective use characteristics: shared or private use. With respect to shared use, a VC (Cluster or Isolated) can be used by more than one flow or more than one transaction type. Generally, a Cluster VC can be assigned for shared use. With respect to private use, a VC (Cluster or Isolated) can be used by a single flow or message type. For example, a host and a target can be assigned to communicate over a VC of their own that no other device shares. Generally, an Isolated VC can be assigned for private use.

Once the VC clustering and usage are defined by the soft capability, the flows or tasks can be assigned to the VCs based on the previously defined object classification (e.g., physical appliance, virtual appliance, application, sub-application message group, etc.). The mapping of information flow to VCs could be static or be computed at runtime based on business driven policies.

Static mapping refers to predetermined mapping between information flow and VCs. Static mapping is not dynamically computed, and may include two sub-categories: address based assignment and application based assignment. With address based assignment, a flow is assigned to the VC (Cluster or Isolated) based on network addresses. With application based assignment, the VCs are assigned based on application types.

With respect to runtime mapping, the VCs are assigned to the information flow on a per transaction or per message group basis by, for example, frame inspection. An example would be to assign data frames for online purchase orders to a higher priority VC, compared with data frames for account summary requests.

Figure 6:
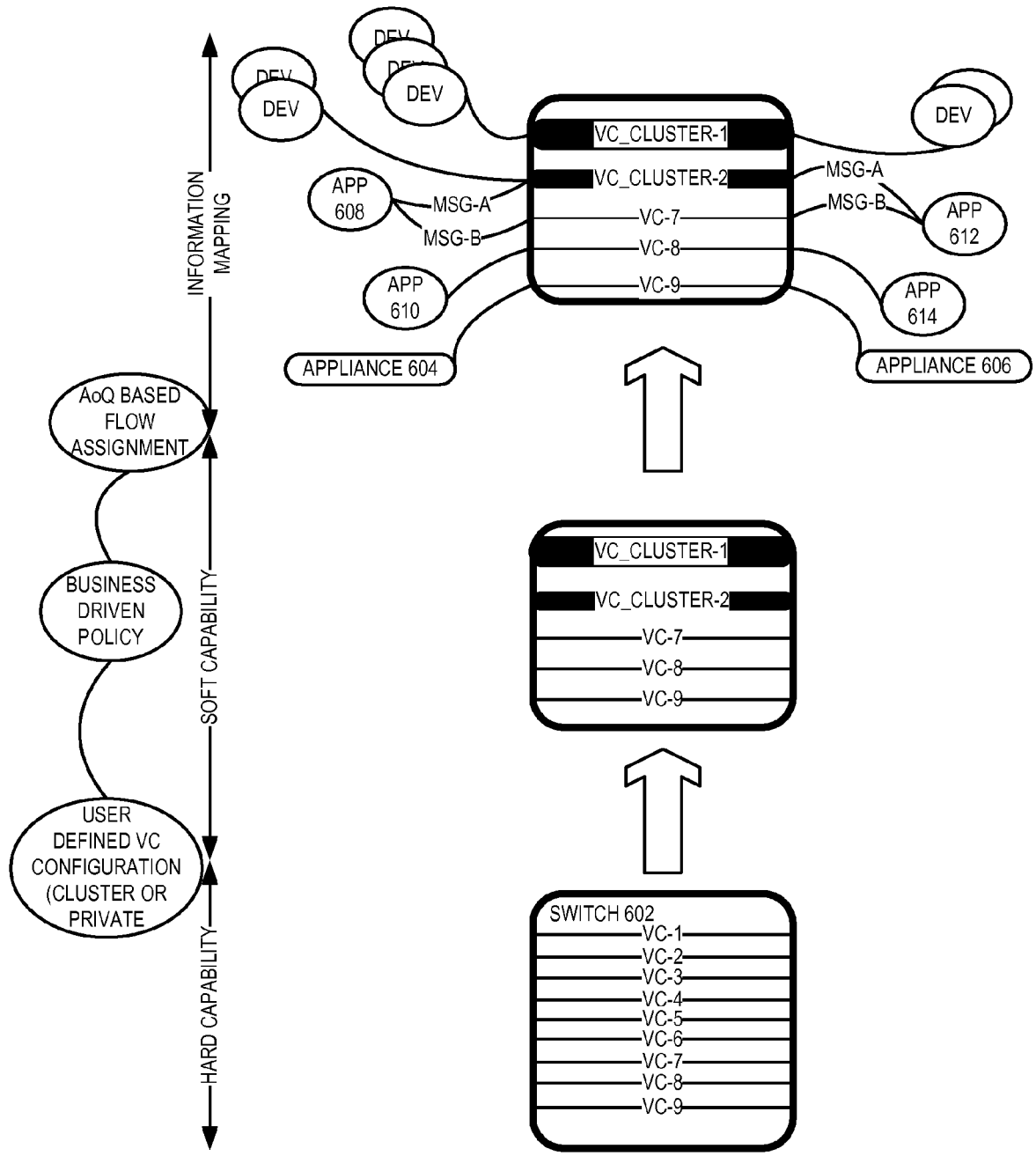
FIG. 6 illustrates an exemplary use case scenario of virtual channel based QoS provisioning, in accordance with an embodiment of the present invention.

FIG. 6 illustrates an exemplary use case scenario of virtual channel based QoS provisioning, in accordance with an embodiment of the present invention. At the hard-capability level, a switch 602 divides the bandwidth in a link into nine VCs. Next, based on a user defined VC configuration, the nine VCs are grouped into two VC Clusters and three Isolated VCs within the switch's soft capability, in accordance with a set of business driven policies. Furthermore, the user can allocate VC-7, VC-8, and VC-9 for private use, whereas VC_CLUSTER-1 and VC_CLUSTER-2 are for shared use.

Subsequently, in the process of application-oriented QoS (AoQ)-based flow assignment, data flows are mapped to the VCs. In this example, VC-9 is dedicated to the traffic between appliance 604 and appliance 606. That is, all the virtual machines and applications hosted by appliances 604 and 606 share VC-9. VC-8 is dedicated to the communication between application 610 and application 614. VC-7 is dedicated to specific message group B between application 608 and application 612. Message group A between application 608 and application 612, as well as a number of additional devices, share VC_CLUSTER-2. Similarly, a number of devices share VC_CLUSTER-1.

Figure 7:
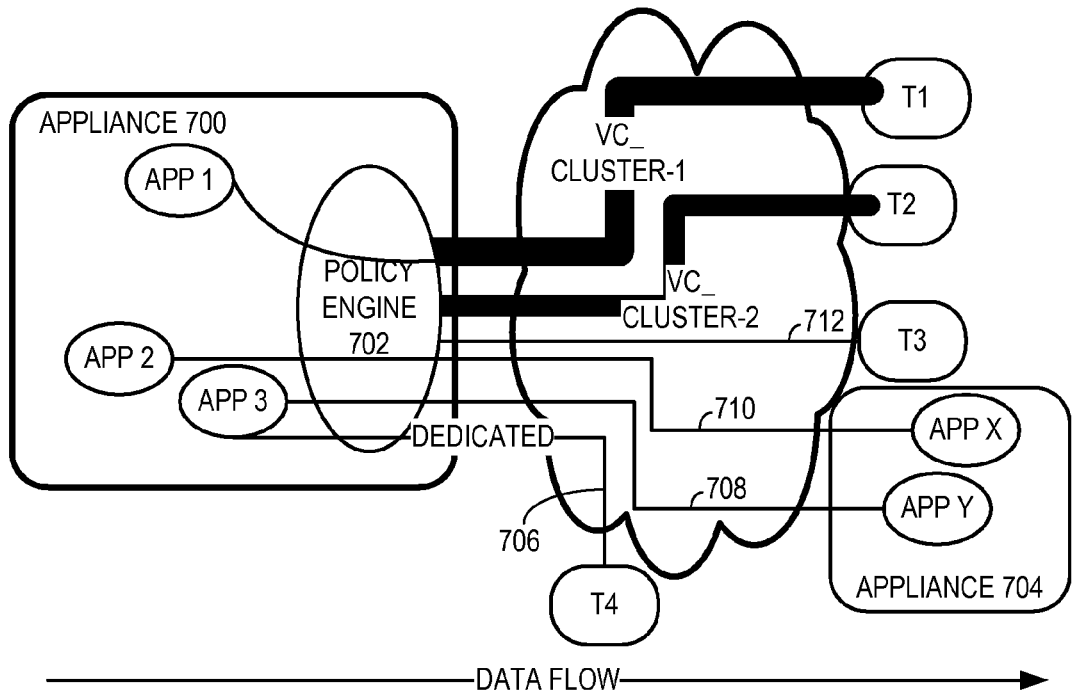
FIG. 7 illustrates another exemplary use case scenario of virtual channel based QoS provisioning, in accordance with an embodiment of the present invention.

FIG. 7 illustrates another exemplary use case scenario of virtual channel based QoS provisioning, in accordance with an embodiment of the present invention. In this example, an appliance 700 includes a policy engine 702 and hosts three applications, APP 1, APP 2, and APP 3. Appliance 700 also includes an HBA which manages two VC CLUSTERS and several VCs. As illustrated in FIG. 7, application APP 3 communicates with a target T4 via a dedicated VC 706. Application APP 3 also communicates with application APP Y in an appliance 704 via a shared VC 708. Additionally, application APP 2 communicates with application APP X in appliance 704 via a shared VC 710. Note that VCs 708 and 710 may be shared with other appliances.

Policy engine 702 further maps the communication from application APP 1 to target T1 to one of the VCs in VC_CLUSTER-1. The communication between appliance 700 and target T2 is mapped to VC_CLUSTER-2. Policy engine 702 also maps the communication between appliance 700 and target T3 to shared VC 712.

Figure 8:
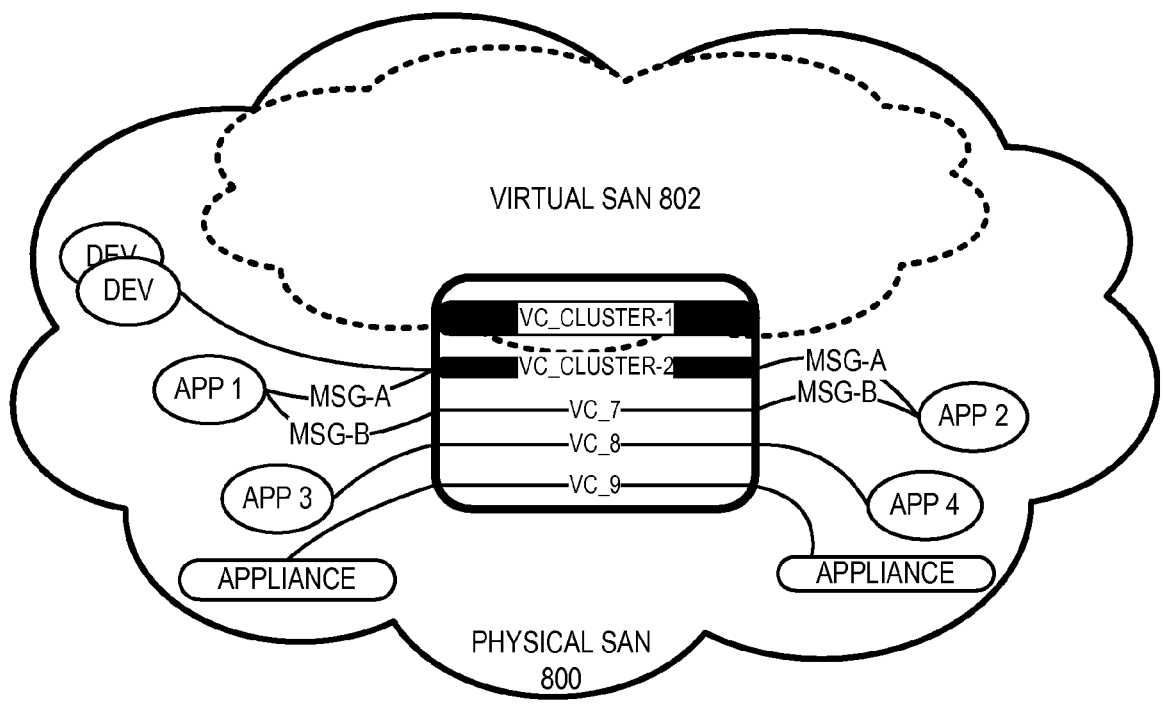
FIG. 8 illustrates an example of virtual channel based QoS provisioning in a virtual SAN environment, in accordance with an embodiment of the present invention.

In one embodiment, private VCs (Cluster or Isolated) could be used in a virtual SAN configuration. FIG. 8 illustrates another exemplary use case scenario of virtual channel based QoS provisioning, in accordance with an embodiment of the present invention. In this example, a virtual switch fabric can be assigned a private VC_CLUSTER-1 of its own with a predefined, guaranteed bandwidth. The virtual switch fabric and VC_CLUSTER-1 can be dedicated to virtual SAN 802. The rest of the VCs and VC clusters can serve the rest of physical SAN 800.

Extending VC and QoS Capability to HBA

As described above, trends in computer hardware have led to the proliferation of powerful yet relatively inexpensive multiprocessor servers. In many cases, applications do not fully utilize these systems. As recent industry developments such as multi-core processors become commonplace, the degree of under-utilization is expected to increase. These realities have led to renewed interest in virtual machines for server consolidation. Virtual-machine environments provide a software layer that enables users to create multiple independent virtual machines on the same physical server.

By running multiple virtual machines simultaneously, a physical server can be driven to much higher utilization. Although the underlying physical resources are shared, each virtual machine is fully isolated from other virtual machines and executes a separate instance of operating system and separate application software. Currently, a majority of virtual machines are FC connected.

As each virtual machine runs as an independent entity, essentially sharing the same hardware underneath like an FC HBA, it is important that these virtual machines have independent FC addresses. The HBA vendors have started to use NPIV for isolating the sessions for each virtual machine. For example, a respective virtual machine can be associated with a fixed port world-wide name (WWN), which is migrated when the virtual machine is moved from one server complex to another.

Since a conventional HBA has only one link to the switch without any VC capabilities, two virtual machines residing in the same physical server could suffer from network congestion incurred on the link between the HBA and the switch. For example, if one virtual machine's target is slow, that virtual machine's data frame would quickly saturate the buffer in the HBA, which is shared with the second virtual machine. As a result, the second virtual machine would starve for bandwidth.

In previous generations of FC products, the VC concept is not extended to the virtual machines and HBAs. The VCs are assigned to a flow only at the ingress of a switch, i.e., at the F_Port or FL_Port coupled to an HBA. Embodiments of the present invention facilitate the extension of VCs and VC-based QoS to HBAs and the logical entities associated with HBAs. As a result, the data flows from different logical entities can be sufficiently isolated from each other within the HBA, which helps prevent network congestion and unfairness.

In embodiments of the present invention, the HBA can negotiate and extend the VCs into the fabric. In general, the HBA can associate each NPIV address with a VC. The HBA can also associate data frames with different VCs based on the CS_CTL field in the data frame's FC header. Furthermore, embodiments of the present invention do not require any direct user configuration of the HBA. With respect to data flows from the HBA to the switch, the switch's F_Port can be in a pass-through mode, where the VC index is retained for the data frame. In other words, the VC associated with a data flow can be set at the HBA and goes all the way to the destination device. With respect to data flow from the switch to the HBA, the VC identifier in a data frame is retained by the switch before the data frame is transmitted to the HBA.

Figure 9:
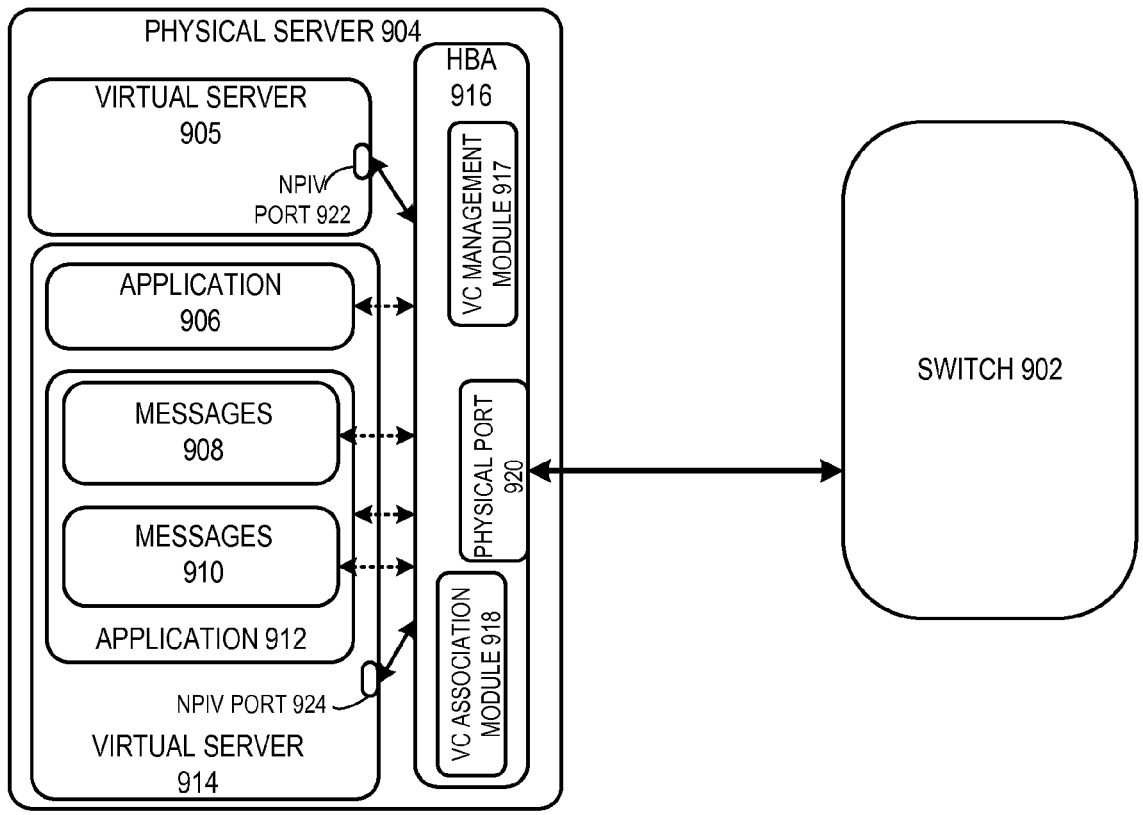
FIG. 9 illustrates an example of establishing virtual channels between a switch and various logical entities associated with a host bus adaptor, in accordance with an embodiment of the present invention.

FIG. 9 illustrates an example of establishing virtual channels between a switch and various logical entities associated with a host bus adaptor, in accordance with an embodiment of the present invention. A physical server 904 includes an HBA 916 and hosts two virtual servers 905 and 914. During operation, HBA 916's physical port 920 logs into a switch 902 and receives an N_Port address. In addition, virtual server 905 and virtual server 914 receive their respective NPIV port addresses from switch 902. For example, virtual server 905 has a virtual NPIV port 922 which can communicate with switch 902 via a VC. Similarly, virtual server 914 has a virtual NPIV port 924. Applications 906 and 912, and sub-application message groups 908 and 910 can communicate with HBA 916 via NPIV port 924. In one embodiment, a VC management module 917 allocates the bandwidth for the VCs, and a VC association module 918 can assign different VCs to the data from different applications and sub-application message groups by inspecting the payload in the data frames (i.e., "sniffing" the payload data). Physical port 920 is responsible for the transmission of the frames. This way, any logical entity associated with HBA 916 can have an independent VC to communicate with switch 902. Other VC dispatching mechanism can also be used by HBA 916.

Figure 10:
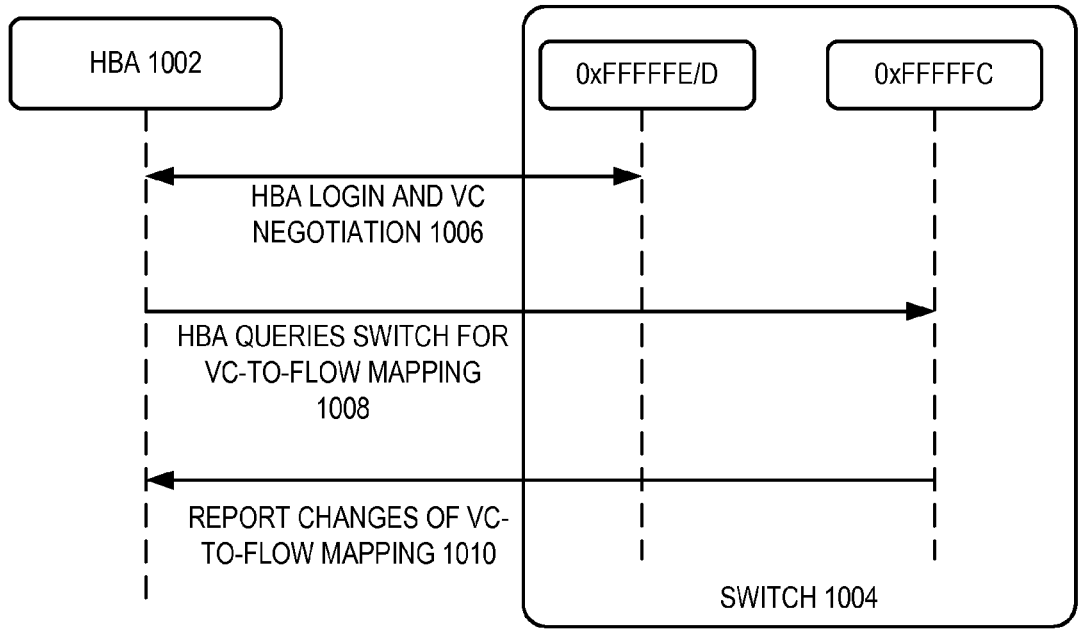
FIG. 10 illustrates a high-level protocol logic between a host bus adaptor and a switch, in accordance with an embodiment of the present invention.

FIG. 10 illustrates a high-level protocol logic between a host bus adaptor and a switch, in accordance with an embodiment of the present invention. In general, an HBA 1002 first establishes the VCs with a switch 1004. To do so, HBA 1002 can perform the fabric login (e.g., FLOGI) and VC negotiation with switch 1004 by communicating with well-known addresses (WKAs) in switch 1004 (such as 0xFFFFFE and 0xFFFFFD) (operation 1006). HBA 1002 can then query switch 1004 for VC-to-flow mapping by communicating with WKA 0xFFFFFC in switch 1004 (operation 1008). Subsequently, when there is a QoS or VC configuration change, switch 1004 can report a VC-to-flow mapping change to HBA 1002 (operation 1010).

Figure 11:
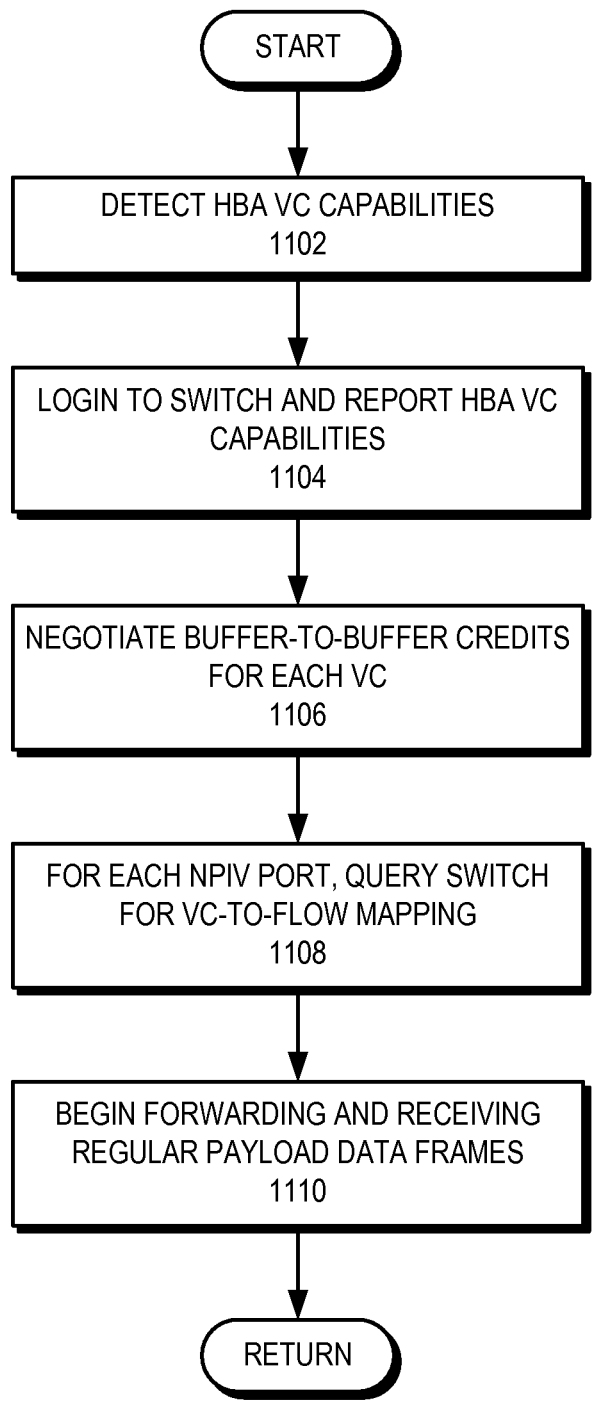
FIG. 11 presents a flow chart illustrating an exemplary process of establishing virtual channels with differentiated QoS between a host bus adaptor and a fabric switch, in accordance with an embodiment of the present invention.

FIG. 11 presents a flow chart illustrating an exemplary process of establishing virtual channels with differentiated QoS between a host bus adaptor and a fabric switch, in accordance with an embodiment of the present invention. During operation, the HBA first detects its VC capabilities (operation 1102). The HBA then performs login to a switch and reports its VC capabilities (operation 1104). Next, the HBA negotiates the buffer-to-buffer credits for each VC (operation 1106). The HBA further queries the switch for VC-to-flow mapping for each NPIV port associated with the HBA (operation 1108). Subsequently, the HBA can begin forwarding and receiving regular payload data frames for different logical entities (operation 1110).

In general, after the HBA receives its network address, it can fetch the VC-to-flow mapping. After the FLOGI procedure (and FDISC if NPIV is used for multiple logical entities), the HBA learns the D_IDs of all the logical entities. In order to compute the flow, the HBA is expected to know the D_ID with which each of its NPIV addresses plans to communicate. For each possible flow, the HBA learns from the switch the proper VC identifier. In one embodiment, the HBA determines the VC-to-flow mapping by sending a query to the switch's name server and/or zone server. In response, the switch's name server replies to the HBA with VC identifiers associated with the flows specified in the query.

Ideally, the HBA queries the VC-to-flow mapping before any application-level communication starts. An HBA may have multiple FC addresses due to the use of NPIV for logical entities. In one embodiment, every time the HBA solicits an FC address from the switch by performing a FLOGI or FDISC procedure, the HBA queries the switch for VC-to-flow mapping information for that FC address. The HBA may optimize the query by specifying multiple addresses in that query. Note that there is no restriction as to how the HBA queries for the VC-to-flow mapping information. Furthermore, it is assumed that the application-level communication starts when an FC address in the HBA sends a port login (PLOGI) sequence to a non-WKA address in the switch.

There are at least two ways to implement a VC-to-flow mapping query: in the form of an Extended Link Service (ELS) query to WKA 0xFFFFFC, and in the form of a Fibre Channel Common Transport (FC-CT) query to the switch's name server. The advantage of an ELS query is that it does not require any overhead associated with PLOGI and PLOGI_ACC. The advantage of a name server FC-CT query is that it is in line with other forms of queries that are performed with the name server. In either case, the payload of the query and response shall be similar. For the sake of simplicity, assume that the query is denoted as QoS_QUERY, whether it is an ELS query or an FC-CT query.

In one embodiment, the QoS_QUERY is sent separately for each NPIV address. The QoS_QUERY can be sent from the S_ID of the NPIV address to the name server at WKA 0xFFFFFC. A second QoS_QUERY can then be sent from the S_ID of another NPIV address. The QoS_QUERY can indicate one of the two modes (Flow Mode and Source Mode) in which the HBA expects the mapping to be. In the Flow Mode, the QoS_QUERY specifies the WWN or D_ID of each destination with which the S_ID of the QoS_QUERY (that is, the NPIV address of the source logical entity) plans to communicate. In the Source Mode, the switch returns the VC for each D_ID that is in the same zone as the S_ID of the QoS_QUERY.

The name server on the switch then sends a response back to the HBA. The response associates a VC with each WWN/ D_ID specified in the QoS_QUERY if it is in the Flow Mode. It is possible that the QoS_QUERY may contain WWNs or D_IDs not known to the switch. In that case, the switch can return a Not Known value for such WWNs or D_IDs. Later, if there is a change to the VC configuration, zone configuration, or QoS configuration (e.g., flow-to-VC mapping), the switch can send a Registered State Change Notification (RSCN) to the HBA, following which the HBA can resend the QoS_QUERY to the switch.

Figure 12:
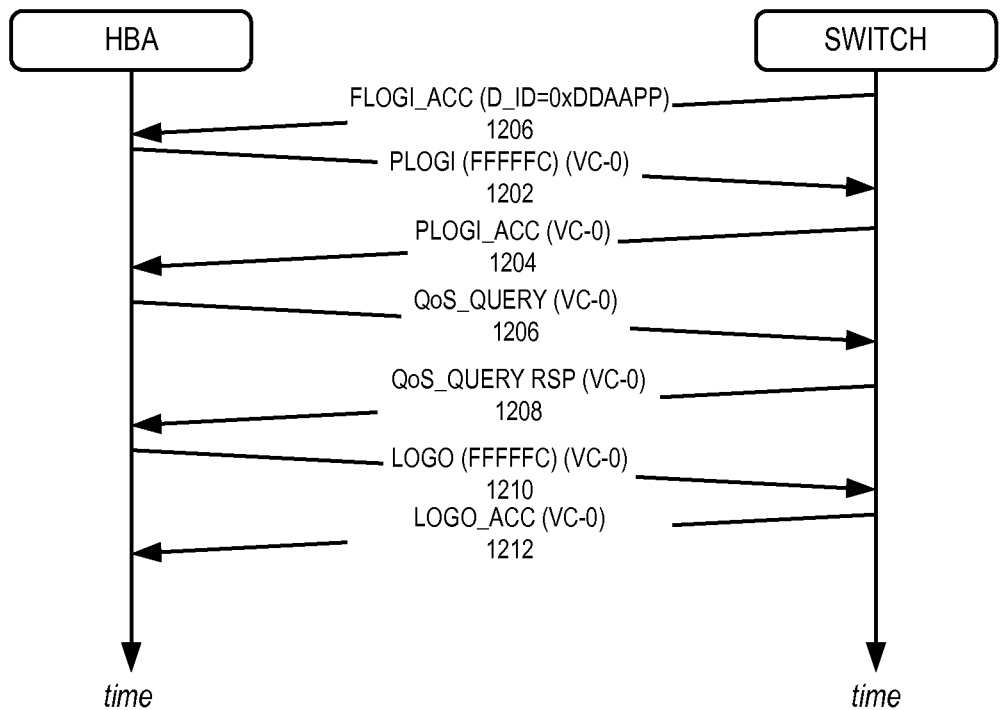
FIG. 12 presents a time-space diagram illustrating an exemplary process of establishing virtual channels between logical entities in a host bus adaptor and a fabric switch using Fibre Channel Common Transport (FC-CT) queries, in accordance with an embodiment of the present invention.

FIG. 12 presents a time-space diagram illustrating an exemplary process of establishing virtual channels between logical entities in a host bus adaptor and a fabric switch using Fibre Channel Common Transport (FC-CT) queries, in accordance with an embodiment of the present invention. During operation, subsequent to the HBA obtaining its FC address (operation 1206), the HBA initiates a PLOGI process on VC-0 which is for Class_F traffic (operation 1202). In response, the switch sends an acceptance PLOGI_ACC (operation 1204). Subsequently, the HBA sends a QoS_QUERY as an FC-CT query to the name server (operation 1206). The switch then sends a response (operation 1208). Subsequently, the HBA sends a logout request (operation 1210). In response, the switch sends back a logout acceptance (operation 1212).

Figure 13:
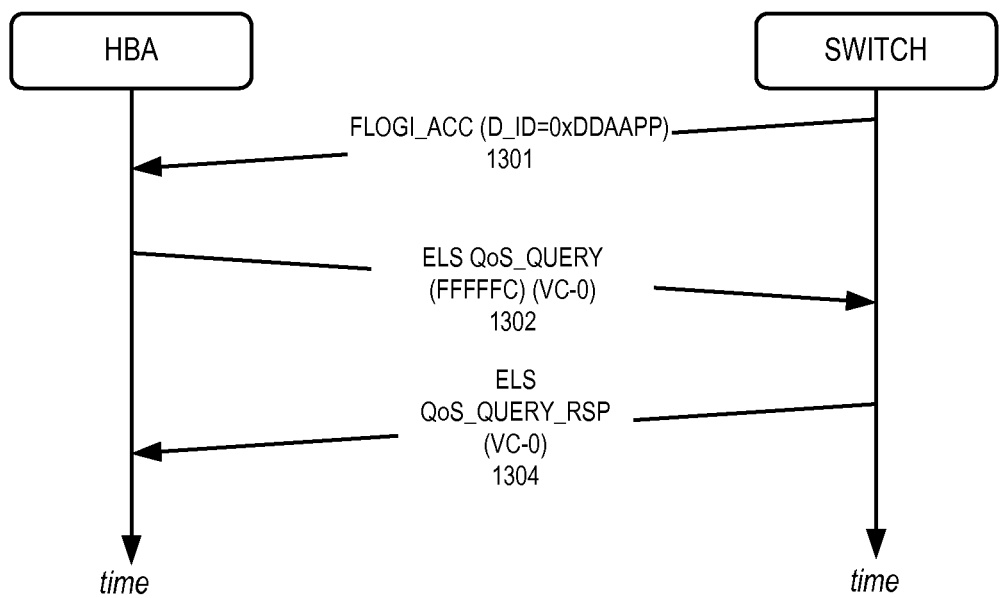
FIG. 13 presents a time-space diagram illustrating an exemplary process of establishing virtual channels between logical entities in a host bus adaptor and a fabric switch using Extended Link Services (ELS) queries, with an embodiment of the present invention.

FIG. 13 presents a time-space diagram illustrating an exemplary process of establishing virtual channels between logical entities in a host bus adaptor and a fabric switch using Extended Link Services (ELS) queries, in accordance with an embodiment of the present invention. During operation, after the HBA has received an FC address (operation 1301), the HBA sends an ELS QoS_QUERY on VC-0 to the switch (operation 1302). In response, the switch sends an ELS response with the VC-to-flow mapping information with respect to the S_ID in the QoS QUERY (operation 1304).

CS-CTL Based VC Assignment

The Class Specific Control (CS-CTL) field in an FC frame header indicates a desired priority for the frame when the frame's priority bit, bit 17, in the F_CTL field of the FC header is set to "1." In one embodiment, the system does not require the HBA to negotiate VCs with the switch. Instead, the ingress switch is responsible for mapping data flows to VCs based on the CS-CTL field in the data frames.

Some applications, such as workload managers in mainframe computers, can pass priority information to the HBA. The HBA can then map such priority information to the CS_CTL values in the FC frames. When the frames enter the ingress port on an FC switch, the switch can be programmed to map different CS_CTL values to VCs.

Note that CS_CTL-based VC assignment can implement all the functions of in-band priority and allow applications to control the VC or QoS class to be associated with the data flows. However, since the HBA is not required to have VC capabilities, data flow isolation may be difficult to attain, and congestion between data flows originated from different virtual servers may still occur on the link between the HBA and the switch.

Figure 14:
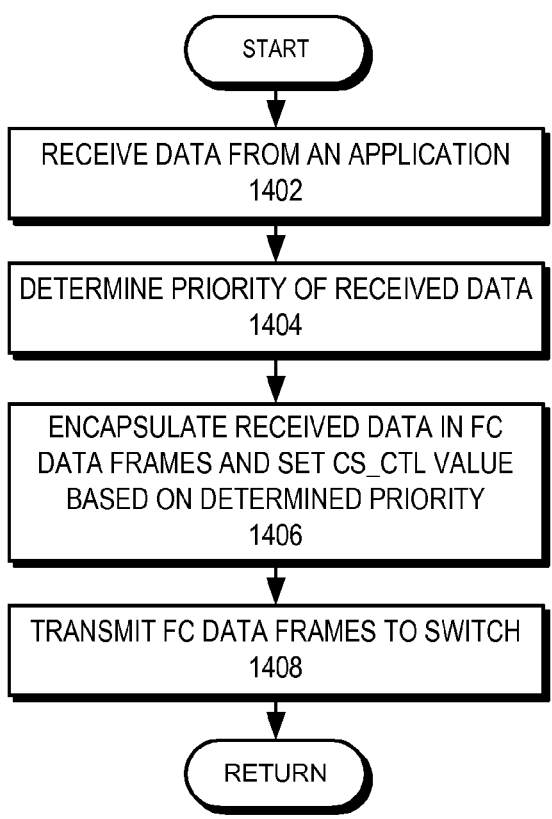
FIG. 14 presents a flowchart illustrating an exemplary process of an HBA assigning CS_CTL values to data received from an application, in accordance with one embodiment of the present invention.

FIG. 14 presents a flowchart illustrating an exemplary process of an HBA assigning CS_CTL values to data received from an application, in accordance with one embodiment of the present invention. During operation, the HBA receives data from an application (operation 1402). The HBA then determines the priority information of the received data (operation 1404). Note that the application may set the priority for the data. If such priority information is not explicitly provided by the application, the HBA may maintain a set of policies that associate priorities to different classes of applications. Note that the term "application" is used in a general sense here. An "application" can be a virtual server, an application running on a physical or virtual server, or a sub-application message group. In other words, the priority-assignment policy maintained by the HBA can associate priorities with any granularities or hierarchies of logical entities that can communicate via the HBA.

Next, the HBA encapsulates the received data in FC data frames and sets the CS_CTL value of these data frames based on the determined priority (operation 1406). The HBA then transmits the data frames to an FC switch (operation 1408).

Figure 15:
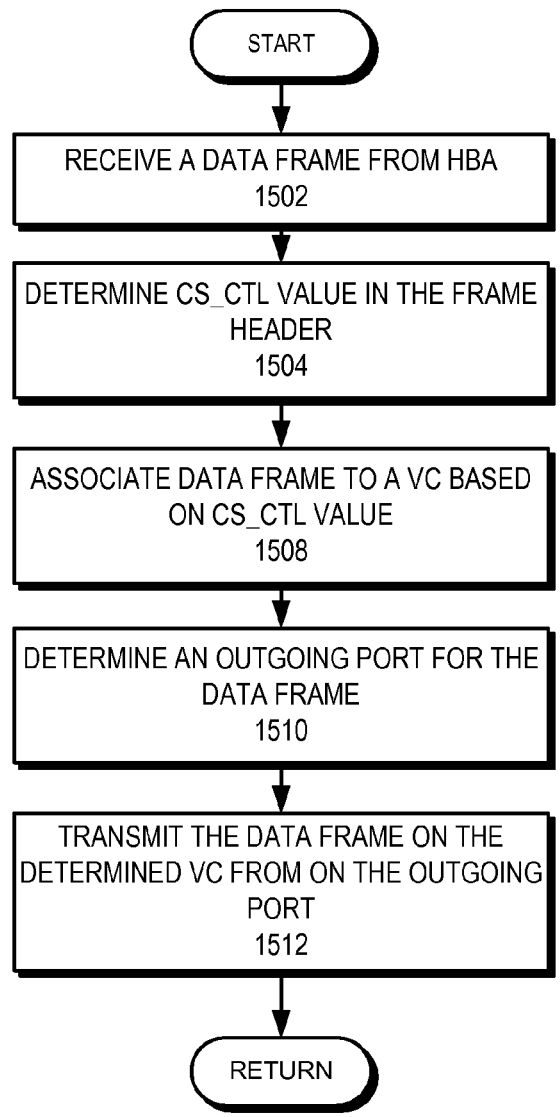
FIG. 15 presents a flowchart illustrating an exemplary process of an FC switch mapping a data frame to a VC based on its CS_CTL value, in accordance with one embodiment of the present invention.

FIG. 15 presents a flowchart illustrating an exemplary process of an FC switch mapping a data frame to a VC based on its CS_CTL value, in accordance with one embodiment of the present invention. During operation, the switch receives a data frame from an HBA (operation 1502). The switch then determines the value of the CS_CTL field in the frame header (operation 1504). Based on the CS_CTL value, the switch associates the data frame to a VC based on the CS_CTL value (operation 1508). The switch further determines an outgoing port for the data frame (operation 1510). Subsequently, the switch transmits the data frame on the determined VC from the outgoing port (operation 1512).

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   allocating the bandwidth on a link between a network interface on an end-host and a switch into a plurality of logical channels, wherein a virtual machine within the end-host is coupled to the switch via at least one of the plurality of logical channels, wherein a respective logical channel is associated with a single class of service;
   grouping a subset of the logical channels into a cluster which contains more than one logical channel;
   associating the cluster with a class of service, wherein two or more clusters are permitted to share a common class of service;
   assigning data frames from the virtual machine to the cluster based on the virtual machine's class of service requirement; and
   transmitting data frames from the virtual machine to the switch on the assigned cluster.

2. The method of claim 1, wherein the data frames from the virtual machine are from one or more of:
   a virtual appliance operating as the virtual machine;
   an application running on the virtual machine; and
   a sub-application message group running on the virtual machine.

3. The method of claim 1, further comprising:
   assigning a weight to a buffer for a respective logical channel; and
   retrieving data frames from the buffers for transmission in their corresponding logical channels in a weighted round robin fashion based on the respective weights assigned to the buffers.

4. The method of claim 1, further comprising requesting a plurality of port identifiers from the switch during initialization, wherein a respective port identifier corresponds to the virtual machine.

5. The method of claim 1, further comprising assigning, during runtime, data frames from a newly added virtual machine to a logical channel or a cluster.

6. The method of claim 1, further comprising disassociating data frames from the virtual machine from the cluster.

7. The method of claim 1, further comprising reassigning the data frames from the virtual machine during runtime to a different logical channel or cluster.

8. The method of claim 1, further comprising:
receiving a data frame from the switch on a logical channel;
determining a class of service for the data frame based on the logical channel; and
forwarding the content of the data frame to the virtual machine in accordance with requirements for that class of service.

9. The method of claim 1, wherein the switch is a Fibre Channel switch; and
wherein the end-host network interface is a host bus adaptor.

10. The method of claim 1, wherein assigning data frames from the virtual machine to the cluster is based on one or more of:
address based static assignment;
application based static assignment;
per transaction dynamic assignment; and
per message dynamic assignment.

11. An end-host network interface for provisioning class of service in a network, the end-host network interface comprising:
a logical-channel management module adapted to allocate the bandwidth on a link between the end-host network interface and a switch into a plurality of logical channels, wherein a virtual machine within the end-host is coupled to the switch via at least one of the plurality of logical channels, wherein a respective logical channel is associated with a single class of service;
a clustering module adapted to group a subset of the logical channels into a cluster which contains more than one logical channel and associate the cluster with a class of service;
a logical-channel association module adapted to assign data frames from the virtual machine to one of the logical channels of the cluster based on the virtual machine's class of service requirement, wherein two or more clusters are permitted to share a common class of service; and
a transmission mechanism configured to transmit data frames from the virtual machine to the switch on the assigned cluster.

12. The end-host network interface of claim 11, wherein the data frames from the virtual machine are from one or more of:
a virtual appliance operating as the virtual machine;
an application running on the virtual machine; and
a sub-application message group running on the virtual machine.

13. The end-host network interface of claim 11, further comprising a scheduling module adapted to:
assign a weight to a buffer for a respective logical channel; and
retrieve data frames from the buffers for transmission in their corresponding logical channels in a weighted round robin fashion based on the respective weights assigned to the buffers.

14. The end-host network interface of claim 11, further comprising a port-requesting module adapted to request a plurality of port identifiers from the switch during initialization, wherein a respective port identifier corresponds to the virtual machine.

15. The end-host network interface of claim 11, wherein the logical-channel association module is further adapted to assign, during runtime, data frames from a newly added virtual machine to a logical channel or a cluster.

16. The end-host network interface of claim 11, wherein the logical-channel association module is further adapted to disassociate data frames from the virtual machine from the cluster.

17. The end-host network interface of claim 11, wherein the logical-channel association module is further adapted to reassigning the data frames from the virtual machine during runtime to a different logical channel or cluster.

18. The end-host network interface of claim 11, further comprising:
a receiving module adapted to receive a data frame from the switch on a logical channel;
a class determination module adapted to determine a class of service for the data frame based on the logical channel; and
a forwarding module adapted to forward the content of the data frame to the virtual machine in accordance with requirements for that class of service.

19. The end-host network interface of claim 11, wherein the end-host network interface is a Fibre Channel host bus adaptor; and
wherein the switch is a Fibre Channel switch.

20. The end-host network interface of claim 11, wherein a the logical-channel association module is further adapted to assign data frames from the virtual machine to the cluster based on one or more of:
address based static assignment;
application based static assignment;
per transaction dynamic assignment; and
per message dynamic assignment.

21. A computer-readable non-transitory medium storing code that represents circuitry for a end-host network interface, wherein the circuitry includes:
logical-channel management circuitry to allocate the bandwidth on a link between the end-host network interface and a switch into a plurality of logical channels, wherein a virtual machine within the end-host is coupled to the switch via at least one of the plurality of logical channels, wherein a respective logical channel is associated with a single class of service;
clustering circuitry to group a subset of the logical channels into a cluster which contains more than one logical channel and associate the cluster with a class of service, wherein the cluster is associated with corresponding use characteristics as a single logical channel;
logical-channel association circuitry to assign data frames from a virtual machine to one of the logical channels of the cluster based on the virtual machine's class of service requirement, wherein two or more clusters are permitted to share a common class of service; and
transmission circuitry to transmit data frames from the virtual machine to the switch on the assigned cluster within the link from the end-host network interface to the switch.

22. A Fibre Channel (FC) network, comprising:
an FC switch;
a network interface on an end-host; and
a physical link coupling the end-host network interface to the FC switch;
wherein the bandwidth on the physical link between the end-host network interface and the FC switch is allocated into a plurality of logical channels, wherein a respective logical channel is associated with a single class of service;
wherein a virtual machine within the end-host is coupled to the switch via at least one of the plurality of logical channels; and
wherein the end-host network interface is configured to:
 group a subset of the logical channels into a cluster which contains
more than one logical channel, wherein the cluster is associated with corresponding use characteristics as a single logical channel;
 associate the cluster with a class of service, wherein two or more clusters are permitted to share a common class of service;
 assign data frames from the virtual machine to one of the logical channels of the cluster based on the virtual machine's class of service requirement; and
 transmit data frames from the virtual machine to the FC switch
on the assigned cluster within the physical link from the end-host network interface to the FC switch.

* * * * *